United States Patent

Yamakawa et al.

Patent Number: 5,110,659
Date of Patent: May 5, 1992

[54] LAPPING TAPE

[75] Inventors: Yoshisuke Yamakawa; Kiyoto Fukushima; Koji Matsuno, all of Saku, Japan

[73] Assignee: TDK Corporation, Japan

[21] Appl. No.: 522,079

[22] Filed: May 10, 1990

Related U.S. Application Data

[63] Continuation of Ser. No. 331,637, Mar. 30, 1989, abandoned.

[30] Foreign Application Priority Data

Apr. 1, 1988 [JP] Japan ................................. 63-77998

[51] Int. Cl.$^5$ ............................................. G11B 23/00
[52] U.S. Cl. ...................... 428/141; 428/328; 428/329; 428/694; 428/900
[58] Field of Search ............... 428/328, 329, 694, 900; 51/281 R

[56] References Cited

U.S. PATENT DOCUMENTS

| | | | |
|---|---|---|---|
| 4,379,800 | 4/1983 | Sato et al. | 428/694 |
| 4,476,177 | 10/1984 | Mizuno et al. | 428/694 |
| 4,478,908 | 10/1984 | Mizuno et al. | 428/694 |
| 4,701,364 | 10/1987 | Miyoshi et al. | 428/900 |

Primary Examiner—Paul J. Thibodeau
Attorney, Agent, or Firm—Wood, Phillips, Van Santen, Hoffman & Ertel

[57] ABSTRACT

A lapping tape has an abrasive coat which comprises an acicular iron oxide powder having a surface area of at least 30 m$^2$/g as determined by the BET method and a granular inorganic powder having a Moh's hardness of more than 7 and contained in an amount of from 2.0 to 30 percent by weight on the basis of the weight of the oxide powder. The coat has a centerline mean roughness between 0.015 and 0.03 μm. Preferably the acicular iron oxide is magnetic, and the inorganic powder ranges in particle diameter from 0.05 to 0.4 μm.

4 Claims, 3 Drawing Sheets

LAPPING TAPE

This application is a continuation of application Ser. No. 331,637, filed Mar. 30, 1989, abandoned.

BACKGROUND OF THE INVENTION

This invention relates to a lapping tape, and more specifically to a lapping tape adapted for superprecision finishing of magnetic heads and the like.

The term "tape" as used herein means any of narrow sheets, ribbons, and other similar thin pieces, long or short.

Lapping tapes are in use for the final finishing of magnetic heads, magnetic disks, and other precision machined parts. For example, the tapes are used to precision polish magnetic heads for fine adjustments of their surface characteristics before their shipment from the manufacturing plants. Also, they are employed to lap and finely polish the magnetic heads already in service periodically so as to maintain their magnetic recording-reproduction characteristics which would otherwise deteriorate with scratches and other damages due to friction with magnetic tapes or disks.

Nevertheless, the existing lapping tapes often produce localized deep bruises or a multitude of long scratches on the work surfaces to mar their characteristics. There has been no lapping tape, to our knowledge, that is totally immune from this trouble.

Lapping tapes of the character are made by dispersing abrasive particles in a binder and applying the dispersion to a base of plastic, metal, or other film, sheet, disk or the like, forming an abrasive coat thereon. Generally, for high precision finishes, coarse particles cannot be used and instead abrasive particles of smaller diameter are employed. Such fine particles, however, too easily aggregate for thorough dispersion. They simply scatter in the resulting abrasive layer and form tiny islands on the lapping tape surface, with consequent localized deep bruises and a large number of general scratches on the work surface. Even a lapping tape claimed to be the highest in performance among the tapes currently available still presents this problem, as is evident from a practical example given below.

Recently a cleaning tape suited for the cleaning of magnetic heads was taught by Japanese Patent Application Publication No. 60725/1987. The tape is obtained by coating a base with an abrasive coating composition prepared by kneading abrasive particles and an extender together with a binder. To be more specific, a particulate nonmagnetic abrasive ($\alpha$-iron oxide or the like), less than 9 on the Moh's scale and from 0.2 to 2.0 $\mu$m in particle size, and magnetic iron oxide particles as an extender in an amount of at least 60 percent by weight of the abrasive amount are used. These powders, mixed with a binder, are applied to a base. The resulting tape has a surface roughness, in terms of centerline mean roughness, between 0.04 and 0.1 $\mu$m. It has, however, been found that despite the description to the contrary in the literature the particulate magnetic abrasive is too coarse in particle size and the resulting surface is too rough to achieve the intended effects. The proposed technique is, after all, of the manufacture of a cleaning tape that is outstandingly effective in removing abraded dust of the magnetic coating of magnetic tapes from the magnetic head. Experiments have revealed that the tape fails to attain a satisfactory grinding effect as a lapping tape and is also unable to preclude scratching by itself.

For the reasons stated the advent of a lapping tape has been awaited which would achieve a satisfactorily high grinding efficiency and yet produce no scratch or deep flaw on the workpieces such as magnetic heads.

SUMMARY OF THE INVENTION

The present invention is aimed at providing an excellent lapping tape which does not produce any deep bruise or scratch on the workpiece.

The aim of the invention is achieved by a lapping tape which comprises a base and an abrasive coat formed thereon, said coat comprising an acicular iron oxide powder having a surface area of at least 30 $m^2/g$ as determined by the BET method and a granular inorganic powder having a Moh's hardness of more than 7 and contained in an amount of from 2.0 to 30 percent by weight of the oxide powder amount, said coat having a centerline mean roughness between 0.015 and 0.03 $\mu$m. Preferably the acicular iron oxide is magnetic, and the inorganic powder ranges in particle diameter from 0.05 to 0.4 $\mu$m.

The lapping tape of the invention is of excellent quality, producing no deep bruise or scratch on the workpiece.

DETAILED DESCRIPTION OF THE INVENTION

Figure 1:
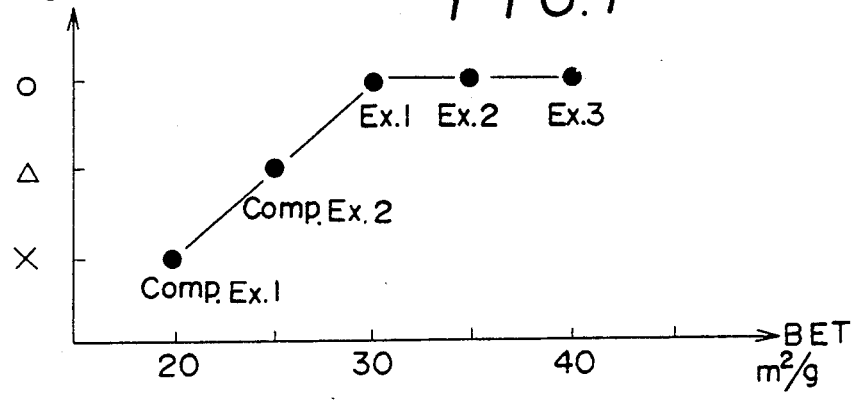
FIG. 1 is a graph showing the relationship between the BET value of magnetic powders and surface roughening of magnetic heads.

This invention uses, combinedly as abrasive particles, an acicular iron oxide powder having a surface area of at least 30 $m^2/g$ as determined by the BET method and a granular inorganic powder having a Moh's hardness of more than 7. Useful acicular iron oxides are magnetite, $\gamma$-iron oxide, cobalt-containing $\gamma$-iron oxide, and $\alpha$-iron oxide, preferably the former three which are all magnetic. The three oxides give better results, probably because their oxidized conditions bring appropriate hardness. The surface area of the acicular iron oxide should be at least 30 $m^2/g$. Although the surface area and particle diameter are generally correlated, experience shows that the designation of the surface area is preferred for greater dependability, partly because of the acicular ratio involved. It has been found that when the surface area is below the specified limit, the particles are coarse enough to damage the magnetic head or other work surface. The damage can deteriorate the Y-S/N ratio and other characteristics of the magnetic head. Even though the lapping tape clears and unchokes magnetic heads, it cannot allow them to regain the characteristics (initial values) of the virgin heads.

The abrasive particles or grains having a Moh's hardness of more than 7 are granular (spherical, amorphous, or polygonal) in shape. Those having a mean particle diameter in the range of 0.05 to 0.4 μm are preferably used. Particles of larger diameters above the range damage the work surface such as of a magnetic head. Conversely, smaller than specified particles are unable to remove surface flaws by the abrading action. Also, if the abrasive is less than 7 on the Moh's scale, the abrading action is too weak to attain the desired tape lapping effect. The abrasive particles utilizable for the invention are any desired granular abrasive powder such as of α-alumina or chromium oxide.

The abrasive particles are contained in an amount of from 2.0 to 30 percent by weight on the basis of the acicular iron oxide amount. If the percentage is less than the specified range, the necessary polishing effect is not attained. If it is more than the range, damaging of the work surface results for some reason yet to be clarified; a probable explanation is that the abrasive particles, when too many, may tend to aggregate and then behave as coarser particles.

The abrasive particles and the acicular magnetic powder are kneaded with a polymeric binder to form a homogeneous dispersion. The dispersion is applied to and solidified on a base of polyester film or the like. The binder is a vinyl chloride-vinyl acetate-vinyl alcohol copolymer, vinyl chloride-vinylidene chloride copolymer, polyester resin, polyurethane resin, or the like. In the case of a thermosetting resin, a curing agent such as a polyisocyanate may also be used. Other binder resins usually used in the art of magnetic tapes may be employed as well. Further, the binder may contain a stabilizer, lubricant, dispersant, or/and other additives commonly used in preparing a polymeric binder mixture. The binder amount is small, only enough to bond abrasive particles to the base; it usually accounts for from about 10 to about 40 percent of the total weight of the particles used.

The mixed coating composition of the abrasive particles, acicular magnetic powder, and binder is applied to a base and dried or hardened in the usual manner.

The lapping tape thus obtained is required to have a centerline mean roughness of the abrasive coat in the range of 0.015 to 0.03 μm. This range of mean roughness can almost infallibly be attained by the choice of the specified surface area, particle diameters, and weight ratio of the two types of powders. Proper choice of additional design factors such as the adjustments and application rates of the binder, solvent, etc. renders it easy to obtain the surface roughness desired. If the surface roughness is below the specified range the abrasion effect is inadequate. An exceedingly rough surface, above the range, would damage the work such as magnetic head.

The lapping tape according to the present invention, in addition to exhibiting an adequate lapping effect, offers the great advantage of lapping without damaging the polished surface and allowing the workpiece to regain its initial characteristic values by abrading away whatever damage it may have on its surface. In these respects the lapping tape of the invention is superior to any of the tapes known in the art.

The invention will be better understood from the following detailed description of examples thereof.

EXAMPLES 1-3 and COMPARATIVE EXAMPLES 1-2

In each example the following composition was prepared (in parts by weight):

| | |
|---|---|
| cobalt-containing acicular gamma-iron oxide (BET value x, Hc 750 Oe) | 90 |
| α-Al$_2$O$_3$ (mean particle dia. 0.3 μm) | 10 |
| binder (vinyl chloride-vinyl acetate copolymer "VAGH"/polyurethane "N2304" 5/5) | 20 |
| lubricant (myristic acid) | 1 |
| organic solvent | 200 |
| polyisocyanate | 5 |

The composition was mixed and dispersed on a ball mill for 48 hours. The resulting dispersion was applied to a 15 μm-thick polyester film to form a coat with a 4.0 μm dry thickness. After the drying, the coat was cured in a thermostat at 60° C. The coated film was slitted into ribbons of a predetermined width to obtain a lapping tape.

Throughout the examples, the BET value x, in m$^2$/g, of the magnetic powder was varied from 20 (Comparative Example 1) to 25 (Comparative Example 2), 30 (Example 1), 35 (Example 2), and 40 (Example 3). In Comparative Example 3, the tape of Example 3 was calendered to adjust the mean roughness to 0.01 μm.

Figure 2:
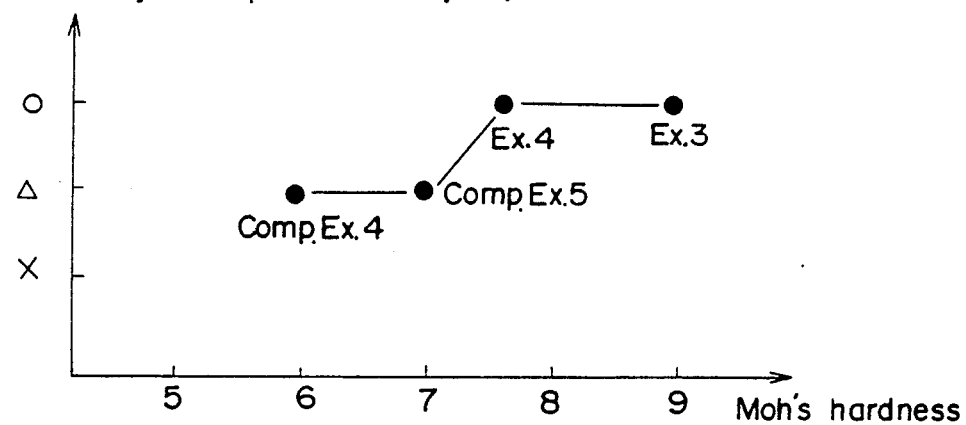
FIG. 2 is a graph showing the relationship between the hardness of abrasive particles and the durability of the resulting lapping tapes.
Figure 3:
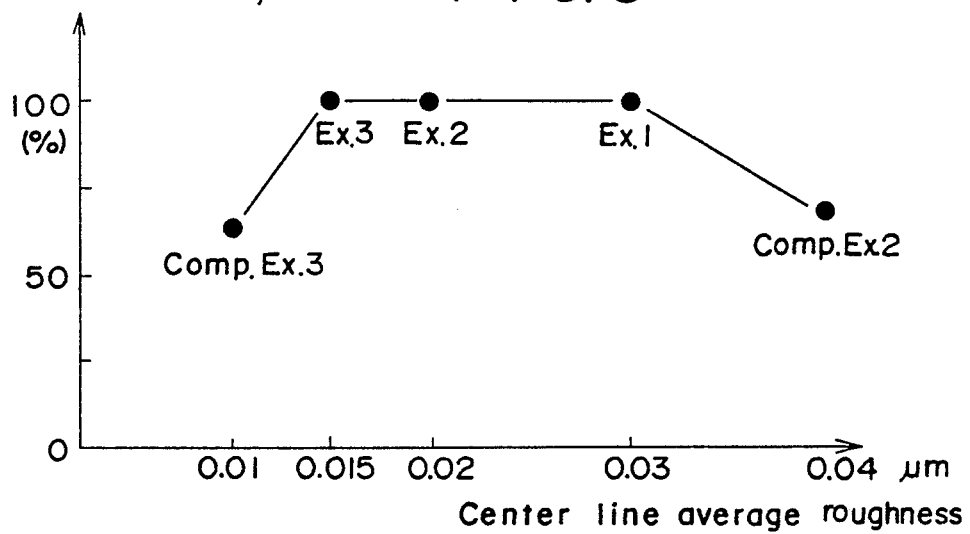
FIG. 3 is a graph showing the relationship between the centerline mean roughness and the S/N ratio of lapping tapes.

The surface centerline mean roughness values (excluding the values below 0.18 Hz and above 9 Hz) of the lapping tapes thus made were determined. Table 1 gives the results. Commercially available video tapes were caused to run past precision polished magnetic heads, one for each, for 30 minutes. The magnetic heads were then lapped for 30 seconds with the lapping tapes of the afore-described examples and comparative examples. The results are graphically represented in FIGS. 1 to 3. FIG. 1 shows that with a magnetic powder having a BET surface area of less than 25 m$^2$/g the magnetic head surface to be lapped clean is abnormally marred. Hence the BET value should be at least 30 m$^2$/g. FIG. 2 clearly indicates that the Moh's hardness is related to the durability of the lapping tape (as evaluated from the degree of wear due to abrasion) and that the tapes embodying the invention exhibited good durability. The relationship between the centerline mean roughness of the lapping tapes and the S/N recovery rate (a measure of the recovery of the original smooth magnetic head surface owing to the smoothening by lapping of the roughened surface) was investigated. It is clear from FIG. 3 that the tapes according to the working examples of the invention achieved by far the greater lapping effects than those of Comparative Example 2 and the like. Comparative Example 3 shows that a too low mean roughness is limited in effect. For these reasons the centerline mean roughness should be chosen from the range from 0.015 to 0.03 μm.

In view of the foregoing, the further examples of the invention and comparative examples to be given below are limited to the cases where only magnetic powders having BET values within the desirable range are used.

EXAMPLES 3-9 AND COMPARATIVE EXAMPLES 4-9

In Example 1 the BET value of the magnetic powder was fixed to 40 m$^2$/g, and α-Fe$_2$O$_3$, SiO$_2$, and α-Al$_2$O$_3$ of the particle diameters and Moh's hardness values given in Table 1 were used in the proportions (contents) shown to make lapping tapes.

In the same way as in the preceding examples the tapes were measured for the centerline mean roughness and tested for lapping performance. The results are summarized in Table 1 and FIGS. 2 through 7.

As depicted in FIG. 2, Comparative Examples 4 and 5 show that the lapping tapes using inorganic abrasive particles with a Moh's hardness of 7 or below were less durable than the tapes of Examples 1 to 4. This means that a Moh's hardness in excess of 7 is essential. The S/N recovery rates of these comparative tapes were approximately 75% and 85%, respectively, again suggesting the inadequate abrasive hardness.

Figure 4:
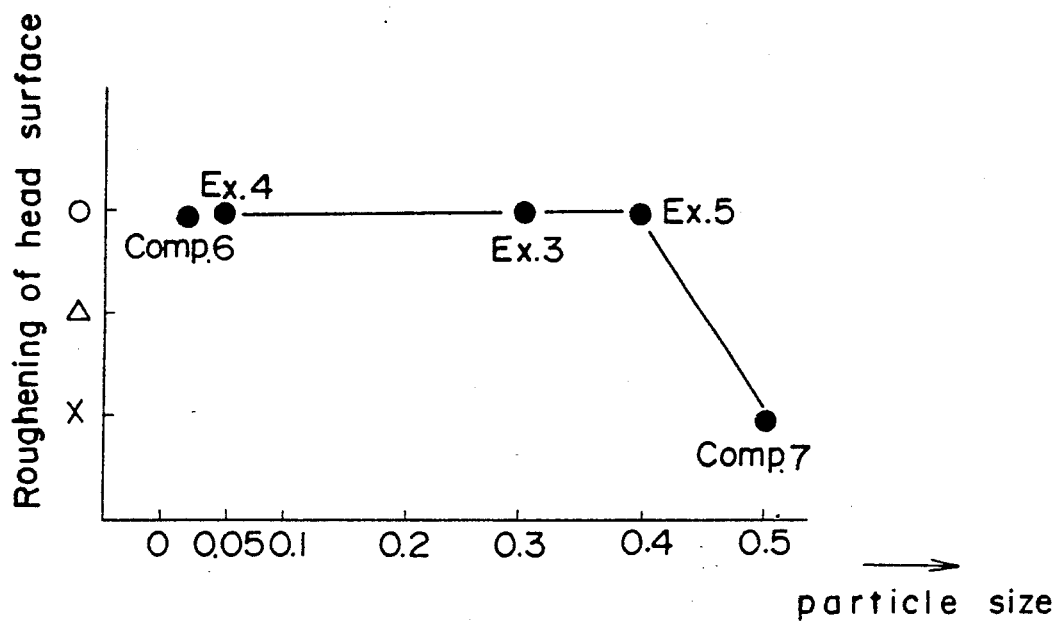
FIG. 4 is a graph showing the relationship between the particle diameter of abrasive particles and the roughened surface conditions of heads.
Figure 5:
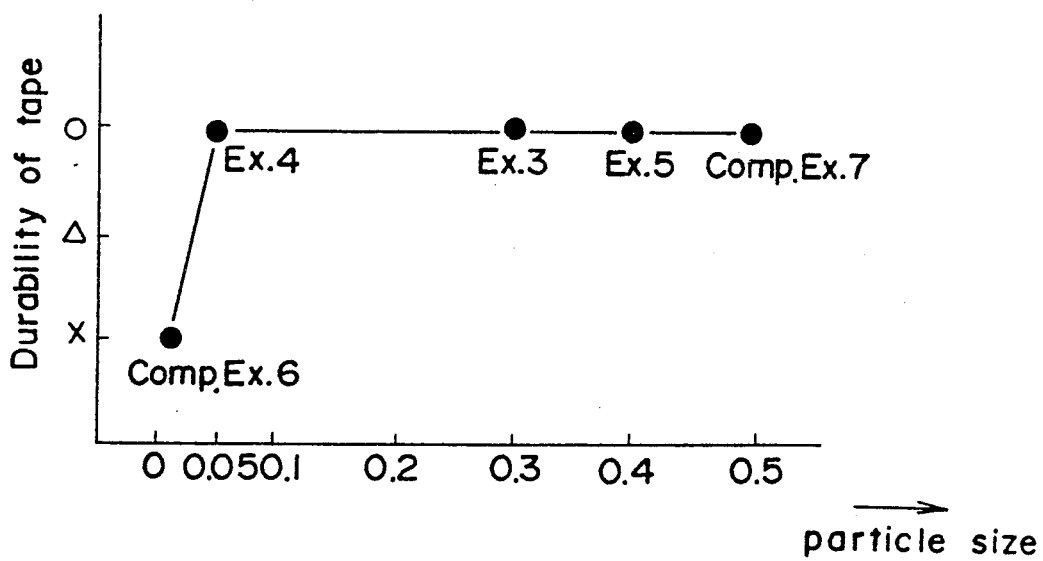
FIG. 5 is a graph showing the relationship between the particle diameter of abrasive particles and the durability of tapes.

Referring now to FIGS. 4 and 5 that represent the influences of the particle diameter of inorganic abrasive particles, it is manifest that too large a particle diameter would damage the magnetic head surface but too small particles would result in abrasion of the lapping tape itself. Hence the desirable mean abrasive particle diameter range of 0.05 to 0.4 $\mu$m.

Figure 6:
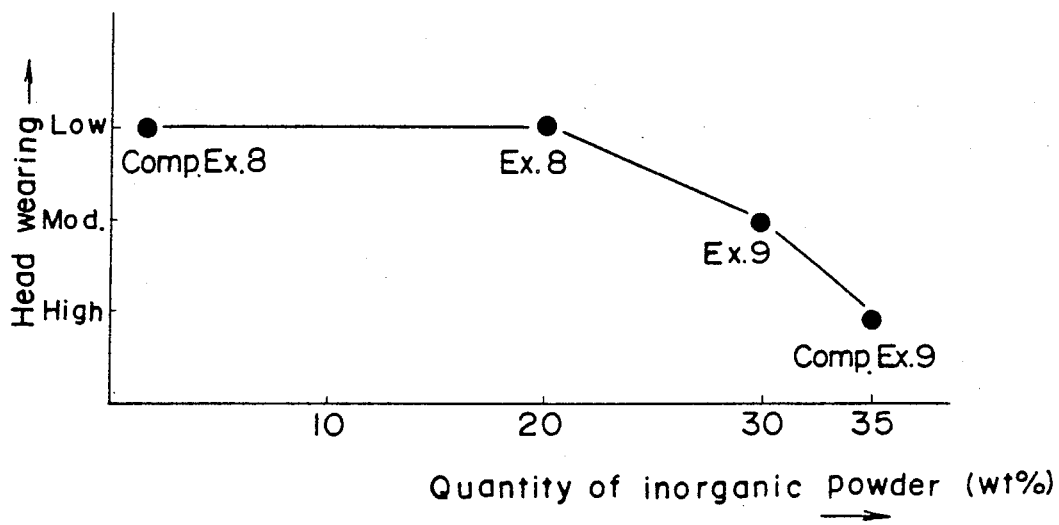
FIG. 6 is a graph showing the relationship between the inorganic abrasive particle contents and the wear of heads.
Figure 7:
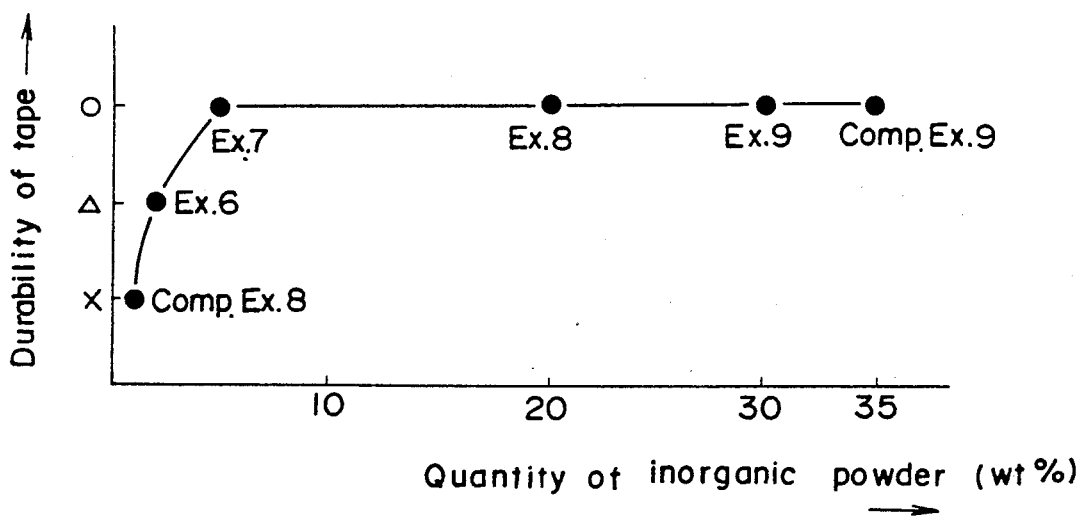
FIG. 7 is a graph showing the relationship between the inorganic abrasive particle contents and the durability of tapes.

Referring next to FIGS. 6 and 7 which show the influence of the quantity of inorganic powder, it is obvious that when the quantity of the inorganic abrasive is too large the wear of the head becomes serious and that when the quantity is too small the abrasion of the tape results.

The content of the inorganic powder in the coating composition should, therefore, range from 2 to 30 percent by weight.

As will be clear from the foregoing description, this invention provides a lapping tape which permits magnetic heads to regain completely their initial polished conditions in relatively short periods of time, without scratching or otherwise damaging the heads.

What is claimed is:

1. A lapping tape comprising a base and a coat having abrasive particles formed thereon, said abrasive particles consisting of:

an acicular iron oxide powder having a surface area of at least 30 m$^2$/g as determined by BET method and selected from the group of magnetite, $\gamma$-iron, and cobalt-containing $\gamma$-iron oxide; and a granular inorganic powder having a Moh's hardness of more than 7 and contained in an amount of 2.0 to 30 percent by weight on the basis of the weight of the oxide powder, said coating having a centerline mean roughness of 0.015 to 0.025 $\mu$m.

2. A lapping tape according to claim 1 wherein said acicular iron oxide is magnetic.

3. A lapping tape according to claim 1 wherein said inorganic powder ranges in particle diameter from 0.05 to 0.4 $\mu$m.

4. A method of polishing the magnetic heads of a video recorder which comprises contacting the magnetic heads with the lapping tape as recited in claim 1.

* * * * *

TABLE 1

| | Magnetic powder BET | Inorganic powder | | | | Centerline mean roughness |
|---|---|---|---|---|---|---|
| | | Type | Moh's hardness | Particle diameter | Content | |
| Comp. 1 | 20 | α-Al$_2$O$_3$ | 9 | 0.3 | 15 wt % | 0.05 μ |
| 2 | 25 | " | " | " | " | 0.04 |
| Ex. 1 | 30 | " | " | " | " | 0.03 |
| 2 | 35 | " | " | " | " | 0.02 |
| 3 | 40 | " | " | " | " | 0.015 |
| Comp. 3 | " | " | " | " | " | 0.01 |
| 4 | " | α-Fe$_2$O$_3$ | 6 | " | " | 0.01 |
| 5 | " | SiO$_2$ | 7 | " | " | 0.02 |
| Ex. 4 | " | Cr$_2$O$_3$ | 8 | 0.05 | " | 0.015 |
| Comp. 6 | " | " | 8 | 0.02 | " | 0.015 |
| Ex. 5 | " | α-Al$_2$O$_3$ | 9 | 0.4 | " | 0.025 |
| Comp. 7 | " | " | " | 0.5 | " | 0.025 |
| 8 | " | " | " | 0.3 | 1% | 0.015 |
| Ex. 6 | " | " | " | " | 2% | 0.015 |
| 7 | " | " | " | " | 5% | 0.015 |
| 8 | " | " | " | " | 20% | 0.015 |
| 9 | " | " | " | " | 30 | 0.02 |
| Comp. 9 | " | " | " | " | 35 | 0.025 |